United States Patent [19]
Baracchi et al.

[11] Patent Number: 5,505,603
[45] Date of Patent: Apr. 9, 1996

[54] APPARATUS FOR MANUFACTURING AN AIR FILTER

[75] Inventors: Fabrizio Baracchi, Turin; Silvano Casalicchio, Bruino; Mauro Gallino, Grugliasco; Luigi Tarditi, Pinerolo, all of Italy

[73] Assignee: Gilardini S.p.A., Turin, Italy

[21] Appl. No.: 192,731

[22] Filed: Feb. 7, 1994

Related U.S. Application Data

[62] Division of Ser. No. 795,316, Nov. 20, 1991, Pat. No. 5,308,559.

[30] Foreign Application Priority Data

Nov. 20, 1990 [IT] Italy ................... 67905 A/90

[51] Int. Cl.$^6$ .................... B29C 44/16; B29C 45/14
[52] U.S. Cl. .................... 425/127; 264/46.4; 264/257; 264/271.1; 264/275; 264/297.3; 264/328.7; 425/348 R; 425/553; 425/576; 425/577
[58] Field of Search .................... 264/DIG. 48, 328.2, 264/46.4, 328.7, 297.3, 271.1, 275, 257, 258, 259; 425/121–127, 348, 297, 553, 576, 573, 577; 55/DIG. 5

[56] References Cited

U.S. PATENT DOCUMENTS

| | | |
|---|---|---|
| 3,183,285 | 5/1965 | Boylan . |
| 3,209,406 | 10/1965 | Hopkins et al. ........... 264/DIG. 48 |
| 3,408,438 | 10/1968 | Staunton ............... 55/DIG. 5 |
| 3,865,919 | 2/1975 | Pall et al. . |
| 4,438,057 | 3/1984 | Sundseth . |
| 4,569,813 | 2/1986 | Taki et al. . |
| 4,584,155 | 4/1986 | Zanella ................. 425/127 |
| 4,626,185 | 12/1986 | Monnet ................. 425/116 |
| 4,688,752 | 8/1987 | Barteck et al. ........... 425/116 |
| 4,734,230 | 3/1988 | Rhodes et al. ........... 425/127 |
| 4,755,339 | 7/1988 | Reilly et al. ............. 264/275 |
| 4,793,793 | 12/1988 | Swenson et al. .......... 425/112 |
| 4,865,793 | 9/1989 | Suzuki et al. ............ 425/126.1 |
| 4,882,055 | 11/1989 | Stamstad . |
| 4,957,672 | 9/1990 | Carter et al. . |
| 5,030,263 | 7/1991 | Kemp . |
| 5,062,874 | 11/1991 | Legare et al. . |

FOREIGN PATENT DOCUMENTS

| | | |
|---|---|---|
| 2162355 | 9/1981 | Germany . |
| 54-15060 | 6/1979 | Japan .............. 55/DIG. 5 |
| 64-58318 | 3/1989 | Japan .............. 55/DIG. 5 |

*Primary Examiner*—Jay H. Woo
*Assistant Examiner*—Duane S. Smith
*Attorney, Agent, or Firm*—Reed Smith Shaw & McClay

[57] ABSTRACT

An apparatus is disclosed for adhering a synthetic resin gasket to a filtering element of an air filter. The apparatus incorporates a mold having a synthetic resin forming gasket cavity therein in which the synthetic resin gasket is formed. The cavity has an injection recess portion and an expansion recess portion. The two portions are separated by a movable mold element which may be positioned to substantially separate or substantially adjoin the injection recess and expansion recess portions. When the movable mold element is in the separation position, synthetic resin may be introduced into the injection recess position without contacting the filtering element. When the movable mold element is in the adjoining position, the resin may expand into the expansion recess until the resin contacts and adheres to the filter element. An automated version of this apparatus is also disclosed.

16 Claims, 3 Drawing Sheets

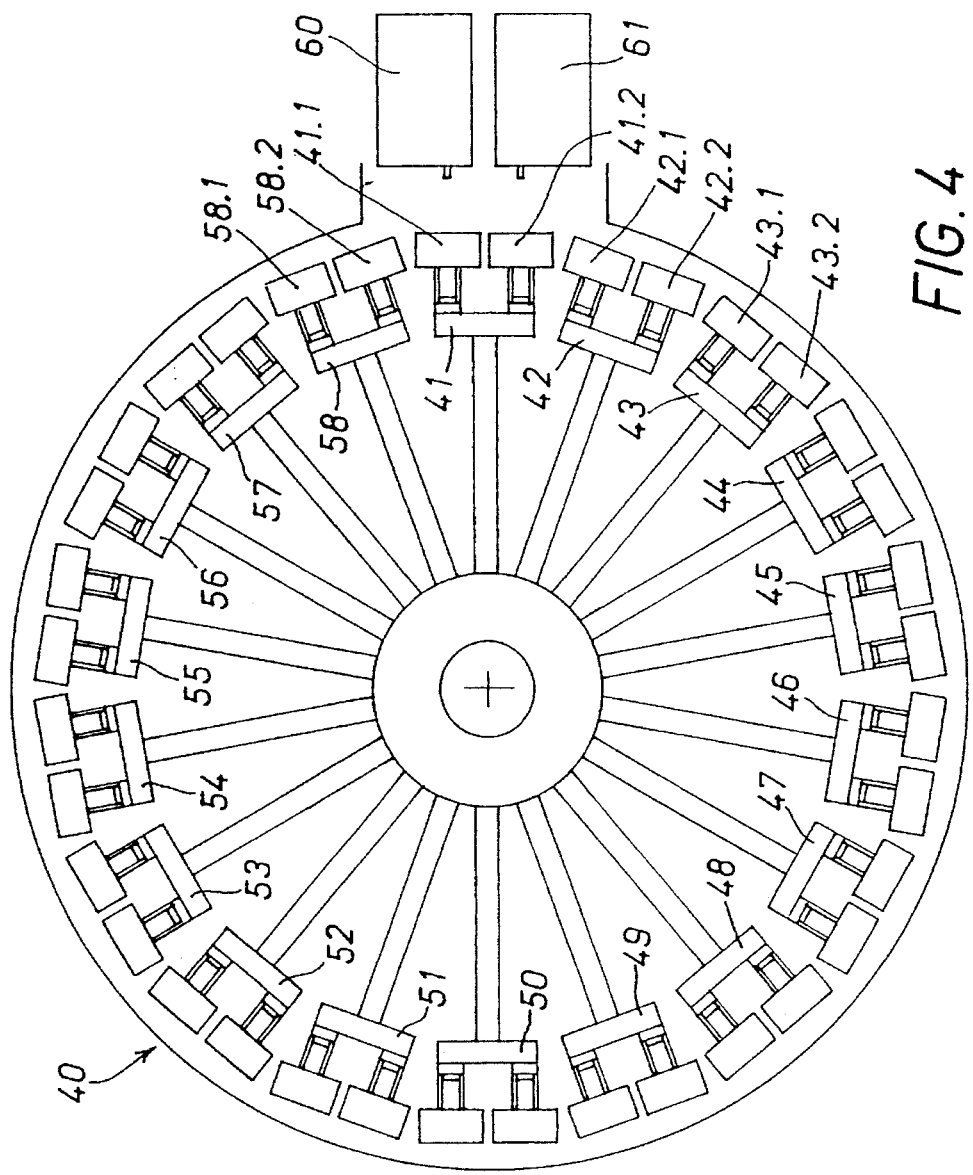
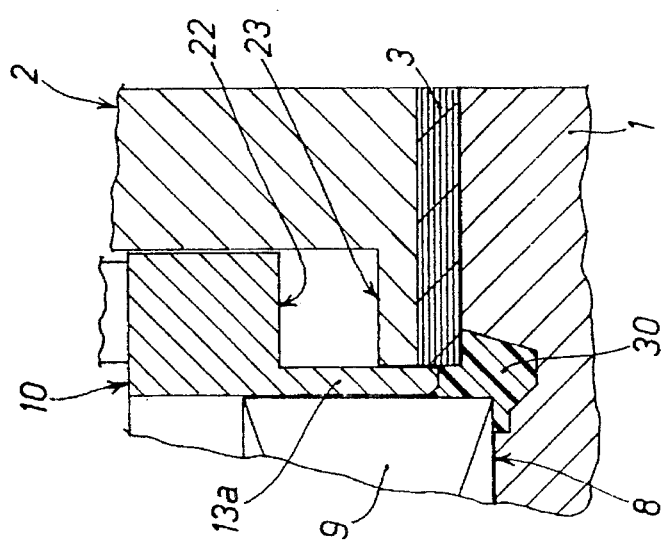
FIG. 4
FIG. 3a

APPARATUS FOR MANUFACTURING AN AIR FILTER

CROSS-REFERENCE TO A RELATED APPLICATION

The present application is a division of U.S. patent application Ser. No. 07/795,316, filed Nov. 20, 1991, entitled "Method For Manufacturing An Air Filter", which issued on May 3, 1994 as U.S. Pat. No. 5,308,559.

BACKGROUND OF THE INVENTION

1. Field of the Invention

The present invention refers to a method for manufacturing an air filter, to the filter thus obtained and to the apparatus to carry out such method.

2. Background Information

An air filter, particularly for vehicle engines, is usually composed of a filtering element made of pleated paper, shaped as a parallelepiped or a cylinder, to which a perimetral edge is adhered, made of foamed resin, usually polyurethane (PU) or polyvinylchloride (PVC). The foamed resin is generally in the form of flexible foam that fixes shape and dimensions of the filtering element, and simultaneously works as seal gasket when the filter is assembled in its vessel, on board of the vehicle.

The foamed resin edge is usually obtained by placing the paper, adequately pleated, into a die, and then injecting or casting the resin into a die recess running all around the paper. The resin at plastic state sticks to the paper generating an edge that copies the die recess shape.

The employment of this technique, however, provides different kinds of problems. One of these problems is created by the possible nonuniform distribution of the resin along the die recess, particularly in the part that is far away from the injection point. Another problem can be the excessive penetration of the resin into the filtering paper, due to the low resistance opposed by it to the melted resin flow that enters the above-said recess under pressure, during injection.

In the German Patent nr. 2.162.355, a die equipped with side plates is proposed to be used, where such plates limit the contact area between paper element and injected resin, to avoid that the latter migrates on the paper and impregnates its pores. However, though the contact area is reduced, a direct interface is always present between filtering paper and injected resin, so that the chance of migration of the resin through the paper cannot be excluded.

SUMMARY OF THE INVENTION

The present invention aims to eliminate or reduce the above-said inconveniences of the known manufacturing methods for paper filters with resin edges, providing a method that allows to make the resin distribution regular into the die recess and to prevent its migration into the filtering paper.

Another purpose of the invention is to provide an apparatus to automatically carry out the above-said method, in order to allow a high productivity in the manufacture of air filters for vehicle engines.

The above-said and other purposes and advantages of the invention, such as the ones resulting from the following description, are reached with a method for manufacturing an air filter, including a preparation stage for a filtering element in pleated paper and a stage to form an edge made of synthetic resin around said filtering element, wherein said stage to form said edge made of synthetic resin is obtained in two sub-stages, first inserting the resin at plastic state into a restrained space outside contact with said filtering element but next to it, until said space is regularly filled, and then connecting said space with the paper filtering element and letting the resin expand until the contact with it and the anchorage to it.

Another object of the invention is composed of an apparatus to manufacture an air filter, including a die in which a perimetral edge made of synthetic resin is formed by injection on a paper filtering element placed inside said die, wherein a mobile frame with parallel walls that are contiguous to the paper filtering element sides is contained in said die, said frame being prone to assume a contact position against the bottom of said die, next to which an injection recess is defined for said synthetic resin, spaced and separated from said filtering element, and an expansion recess, internally delimited by said filtering element; and a disconnection position from the bottom of said die, next to which said injection and expansion recesses are a single recess that extends up to said paper filtering element, so that the resin can reach by expansion said paper filtering element and anchor to it.

The invention also relates to the filter obtained with the above-said method.

A preferred embodiment of the invention will now be described, given as an illustrating and not limiting example, with reference to the accompanying drawings.

BRIEF DESCRIPTION OF THE DRAWINGS

FIG. 3a is an enlarged sectional view of a part in FIG. 3; and

FIG. 4 is a schematic plan view of a machine to manufacture filters including the apparatus according to the invention.

DESCRIPTION OF THE PREFERRED EMBODIMENTS

Figure 1:
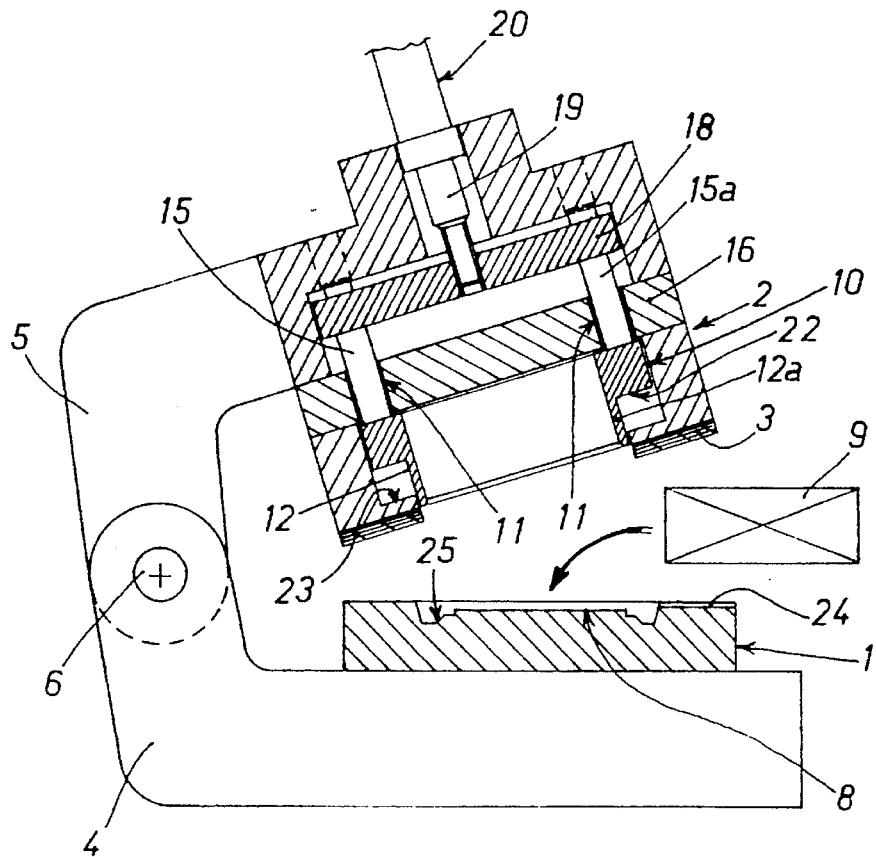
FIG. 1 is a partially sectional view of the apparatus according to the invention with open die.
Figure 2:
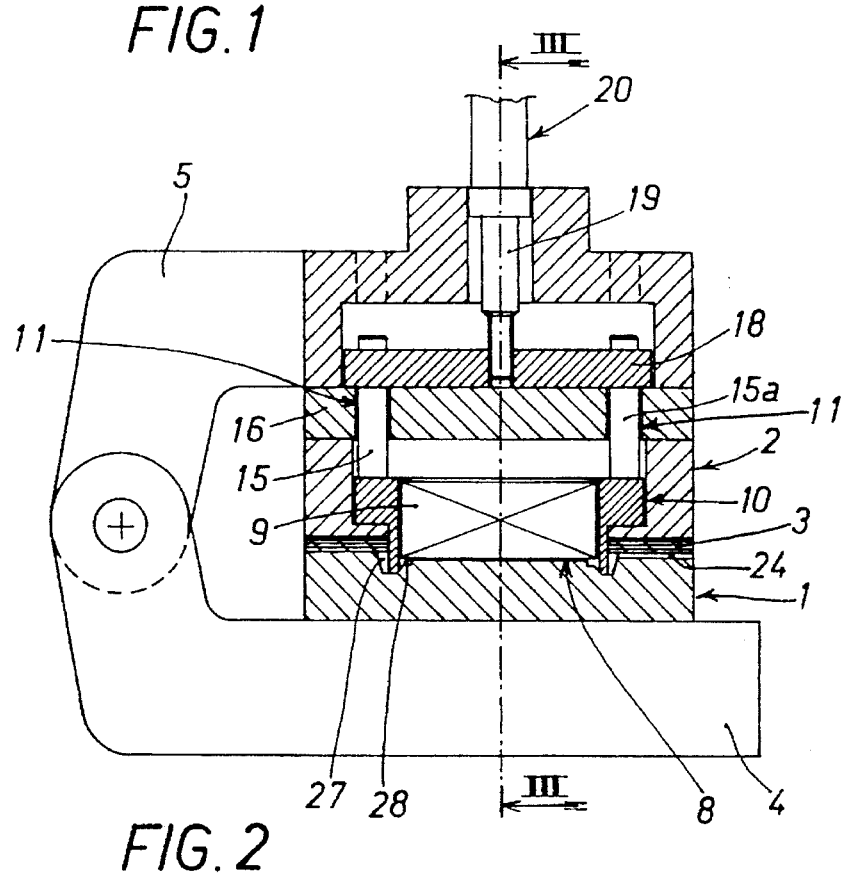
FIG. 2 is a partially sectional view of the apparatus in FIG. 1, with closed die, in the injection position.
Figure 2A:
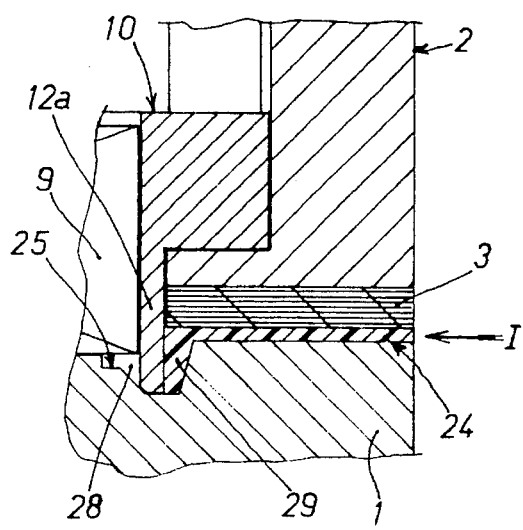
FIG. 2a is an enlarged sectional view of a part in FIG. 2, during injection.
Figure 2B:
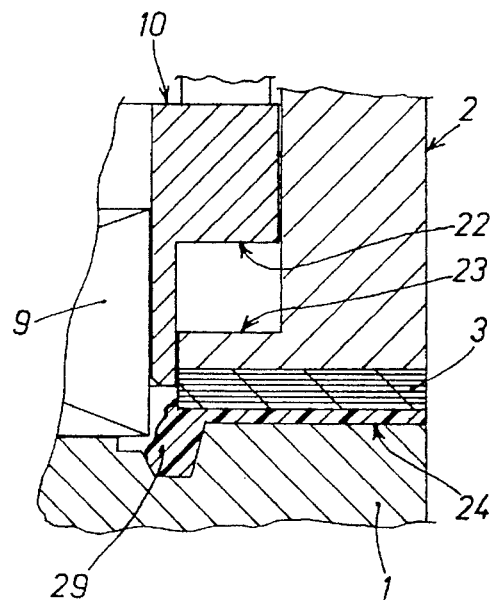
FIG. 2b is a view corresponding to the one in FIG. 2a, during expansion.
Figure 3:
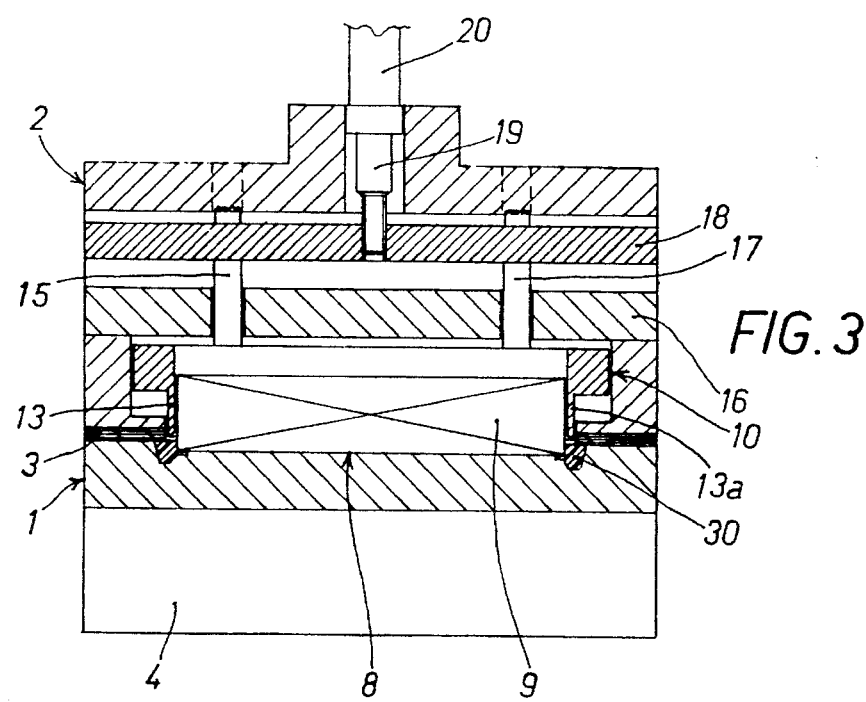
FIG. 3 is a sectional view along line III—III in FIG. 2, in another operative position.

With reference to FIG. 1, the apparatus according to the invention includes a die composed of a lower die 1 and an upper die 2, equipped with a gasket 3 on its lower side aimed to press closed against the lower die 1. The two dies 1 and 2 are rotatingly constrained one another through their respective arms 4 and 5 with fulcrum on the pin 6. FIG. 1 shows the open die, while FIG. 2 shows the closed die. The central plane 8 of the lower die 1 is realized of such shape and dimension as to be able to house a paper filtering element 9, produced apart in a known way. In case of air filters for vehicle engines, the filtering element has the shape of a cylinder or a parallelepiped. In the shown case, the filtering element 9 is a parallelepiped in shape. Inside the die 2 a structure is contained, essentially composed of a quadrangular frame 10, whose hollow interior has shape and dimensions corresponding to those of the filtering element 9, and is therefore such as to surround and keep in position on the plane 8 the filtering element during working, as will be said afterwards. With reference also to FIGS. 2 and 3, the frame 10 consists of four orthogonal walls 12, 12a, 13, 13a, rigidly connected one another, and upper connected to four columns 15, 15a, 17, 17a (this one cannot be seen in the figure), that are suitable to slide in holes 11 provided in a driving plate 16 of the upper die, and are then secured to plate 18, parallel to plate 16. The plate 18 is in turn connected to the piston 19 of an actuator cylinder 20, only partially shown. In the retracted position of the piston in the cylinder, shown in FIGS. 1, 2b, 3, 3a, the frame 10 is lifted as regards the lower die 1, but, with closed die, surrounds the filtering element 9 and keeps it centered on the bearing plane 8 of the lower die 1. In the extended position of the piston 19, shown in FIG. 2, the frame 18 is seated against the die 1, and in this position the plate 18 seats against the driving plate 16. The piston 19 stroke is adjusted in such a way as to realize this bedding and disconnection movement of the frame 18 against the die 1. For this purpose, the frame 18 is formed with a continuous shoulder 22 suitable to seat against the stop surface 23 of the upper die 2.

Around the bearing plane 8 of the lower die 1, a channel 25 is defined whose profile generates the section of the edge made of flexible foam of foamed resin that must be formed around the filtering element 9. The frame 18 seats, while closing, inside such very channel, defining, in the radially external part of the channel 25, an injection recess 27, separated and insulated from the filtering element 9, and, in the radially internal side of the channel 25, an expansion recess 28, internally delimited by the filtering element 9 (FIG. 2). This latter one preferably extends till below a part of the filtering element, in order to allow a better anchorage of the resin. This is shown in detail in the part of FIG. 2a.

The recess 27, more external, communicates with an injection channel 24, through which the melted resin is injected into the die.

The operation of the described apparatus is the following one. With open die (FIG. 1), a filtering element 9, previously prepared, is placed on plane 8 of the lower die. After that, the die is closed and the frame 10 is seated against the lower die 1. The walls 12, 12a, 13, 13a settle in a radially intermediate position inside channel 25, so that the injection recess 27 and the expansion recess 28 (FIG. 2) are defined. The melted resin 29 is injected into the recess 27, as indicated by arrow I in FIG. 2a. The resin 29 is regularly and homogeneously distributed along the whole recess, completely filling it. After a time varying depending on the properties of the used resin, on the recess geometry and on other operating factors, the frame 10 is lifted and the resin is allowed to expand through the expansion recess 28, now communicating with the recess 27, till the filtering element 9 is reached, to which the resin adheres and anchors. The expansion of resin 29 towards the filtering element 9 is shown in the part of FIG. 2b. It is evident that the resin anchorage to the filter paper only occurs under the thrust determined by the expansion, and not owing to the much stronger thrust generated by the injection pressure, as well known in the technique. Therefore, a deep penetration of the melted resin does not occur into the paper filtering element, that would produce an excessive impregnation of it, with following decrease of the filtering surface and capacity.

After having ended the expansion and cooled the resin, the complete on-board filter 30 is produced with flexible foam of foamed resin, like in FIG. 3 and in the part in FIG. 3b. At that time, the die is opened, the filter is removed, another paper filtering element is placed into the die and the described cycle is repeated.

FIG. 4 shows a machine for the volume production of the filter using the above described apparatus.

The machine consists of a carrousel carrying 18 work stations progressively numbered from 41 to 58, each comprising two molding apparatus of the above described type, for a total of 36 apparatus. Every apparatus is marked by numbers 41.1 and 41.2, 42.1 and 42.2, 43.1 and 43.2 ... 58.1 and 58.2. Each one of the single molding apparatus can produce only one filter, like in the embodiment described by the previous figures, or can produce more filters, for example when their dimensions are small. In this case, the lower die will be formed with a channel that surrounds every bearing plane of every filtering element, and all the channels will communicate with the injection channel. Also the mobile frame that limits the injection recess will be a multiple one, with such shape and dimensions as to allow the production of more filters within a single molding operation.

Next to the carrousel 40, a double injection unit is placed, composed of two injectors 60 and 61, aligned from time to time with each device in each work station 41 ... 58 of the carrousel 40. The injection unit is sided by the stocking tanks for raw materials and additives, in a known way, and therefore not shown. For every carrousel 40 turn of a 20° angle, the injection unit is aligned with a work station. In this alignment condition, the injectors are pushed against the apparatus of each work station—with an automatism known to any experienced person in the field—and at the same time the resin injection occurs into each one of the two apparatus composing every single work station. In the meantime, the finished filter is unloaded from the previous stations and the paper filtering element is loaded into the following ones, realizing a volume production with high productivity.

The described method and apparatus are particularly advantageous to produce air filters for vehicle engines, though their use is possible also to produce air filters suitable for other uses.

A preferred embodiment of the invention has been described, but obviously it is prone to several modifications and variations within the same inventive idea.

We claim:

1. A molding apparatus for manufacturing an air filter, said filter comprising a filtering element, said apparatus comprising:

means for positioning said filtering element in a mold, said mold having a cavity, said cavity having an injection recess portion and an expansion recess portion such that said filtering element abuts said expansion recess portion of said cavity;

means for forming an edge made of synthetic resin around said filtering element, wherein said forming means comprises a means for injecting said resin into said injection recess portion of said cavity, said resin in said injection recess initially not being in substantial contact with said filtering element by virtue of the positioning of a movable mold element which substantially separates said injection recess from said expansion recess; and means for connecting said injection recess to said expansion recess by moving said movable mold element such that said resin is able to expand until said resin contacts and adheres to said filtering element.

2. The apparatus of claim 1, wherein said positioning means further comprises an upper portion movably adjoined to a lower portion, said positioning means having an open position and a closed position, said open position allowing for the insertion or removal of said filtering element.

3. The apparatus of claim 2, wherein said cavity is substantially formed when said positioning means is in said closed position.

4. The apparatus of claim 3, wherein said mold has an injection channel therein, said channel allowing for the introduction of said resin into said cavity.

5. The apparatus of claim 4, wherein said movable mold element is movably mounted to said upper portion of said positioning means.

6. The apparatus of claim 5, wherein said movable mold element is positioned by an actuator.

7. The molding apparatus of claim 6, wherein said apparatus further comprises:
- a means for rotating a carousel, said carousel comprising a plurality of molding stations, each molding station having at least one molding apparatus mounted to said molding station; and
- a means for transferring synthetic resin into said cavity of each molding apparatus, said transferring means positioned such that said injection channel of each molding apparatus may be aligned with said injection unit to allow for the transfer of said resin to said cavity.

8. The apparatus of claim 7, wherein said apparatus further comprises:
- molding stations each comprising two molding apparatus mounted to each molding station; and
- means for transferring synthetic resin into said cavity of each molding apparatus, said transferring means positioned such that said injection channels of both molds of each molding station may be aligned with said transferring means to allow for the transfer of said resin to said cavities of each of said molding stations.

9. A molding apparatus for manufacturing an air filter, said filter comprising a filtering element, said apparatus comprising:
- a mold having a synthetic resin gasket forming cavity therein, said cavity having an injection recess portion and an expansion recess portion, said filtering element being able to be positioned in said mold substantially adjacent to said expansion recess portion of said cavity; and
- a movable mold element movably mounted to said mold such that said mold element may be positioned to substantially separate said injection recess portion from said expansion recess portion or to substantially adjoin said expansion recess portion to said expansion recess portion such that said synthetic resin may be introduced into said injection recess without contacting said filtering element when said movable mold element is in said separation position, and such that said resin may expand into said expansion recess until said resin contacts and adheres to said filtering element when said movable mold element is in said adjoining position.

10. The apparatus of claim 9, wherein said mold further comprises an upper portion movably adjoined to a lower portion, said mold having an open position and a closed position, said open position allowing for the insertion or removal of said filtering element.

11. The apparatus of claim 10, wherein said gasket forming cavity is substantially formed when said mold is in said closed position.

12. The apparatus of claim 11, wherein said mold has an injection channel therein, said channel allowing for the introduction of said resin into said gasket forming cavity.

13. The apparatus of claim 12, wherein said movable mold element is movably mounted to said upper portion of said mold.

14. The apparatus of claim 13, wherein said movable mold element is positioned by an actuator.

15. The molding apparatus of claim 14, wherein said apparatus further comprises:
- a rotating carousel having a plurality of molding stations, each molding station having at least one molding apparatus mounted to said molding station; and
- a synthetic resin injection unit adjacent to said apparatus, said injection unit positioned such that said injection channel of each molding apparatus may be aligned with said injection unit to allow for the transfer of said resin to said gasket forming cavity.

16. The apparatus of claim 15, wherein said apparatus further comprises:
- molding stations each comprising two molding apparatus mounted to each molding station; and
- a synthetic resin injection unit adjacent to said apparatus, said injection unit positioned such that said injection channels of both molds of each molding station may be aligned with said injection unit to allow for the transfer of said resin to said gasket forming cavities of each of said molding stations.

* * * * *

UNITED STATES PATENT AND TRADEMARK OFFICE
CERTIFICATE OF CORRECTION

PATENT NO. : 5,505,603
DATED : April 9, 1996
INVENTOR(S) : Fabrizio Baracchi et al It is certified that error appears in the above-indentified patent and that said Letters Patent is hereby corrected as shown below:

At column 3, line 16, delete "18" and insert --10--; and

At column 3, line 20, delete "18" and insert --10-- (both occurrences).

Signed and Sealed this

Third Day of September, 1996

Attest:

BRUCE LEHMAN

Attesting Officer          Commissioner of Patents and Trademarks